United States Patent Office 3,445,540
Patented May 20, 1969

3,445,540
ORGANOALUMINUM-COBALT SALT-TRISPHOSPHINE CATALYSTS FOR USE IN PREPARING 1,4-DIENES
Christos Sarafidis, Wilmington, Del., assignor to E. I. du Pont de Nemours and Company, Wilmington, Del., a corporation of Delaware
No Drawing. Filed Apr. 3, 1968, Ser. No. 718,369
Int. Cl. C07c *3/60;* B01j *11/00*
U.S. Cl. 260—680                        13 Claims

ABSTRACT OF THE DISCLOSURE

A catalyst for use in preparing 1,4-dienes from α-monoolefins and conjugated dienes is prepared by mixing an organoaluminum compound, a cobalt salt, and a trisphosphine. A process utilizing said catalysts for preparing 1,4-dienes is also desclosed.

BACKGROUND OF THE INVENTION

Alpha-olefin elastomers are of increasing importance today. Particularly valuable are the copolymers containing sulfur-curable side-chain unsaturation resulting from incorporation of nonconjugated diene units. U.S. Patent 2,933,480 to Gresham et al., describes representative copolymers of this type. Nonconjugated dienes useful in making these copolymers include 1,4-hexadiene and its derivatives wherein the monomer still has one terminal vinyl group, e.g., 4-methyl-1,4-hexadiene. Other 1,4-diene containing elastomers are also important, for example, the copolymer prepared by copolymerizing isobutylene with 2-alkyl-1,4-hexadienes in the presence of a cationic catalyst, e.g., a Friedel-Crafts catalyst such as boron trifluoride or stannic chloride-water.

Various catalysts are known for use in synthesizing 1,4-dienes from α-monoolefins and conjugated dienes. French Patent 1,462,308 discloses a process for making 1,4-hexadiene which uses a catalyst comprising (1) a cobalt or iron salt, (2) a bisphosphine, and (3) an organoaluminum compound. While some of the catalysts disclosed in this publication are effective in catalyzing the desired reaction, others are deficient with respect to their activity and stereoselectivity, i.e., their use results in the production of substantial amounts of undesirable by-products in addition to the desired 1,4-dienes. Many other catalysts of a similar nature have the same deficiencies.

Because of the great utility of aliphatic 1,4-dienes in making important elastomers, the search continues for catalyst systems of high activity and ready availability which, when used in the reaction of conjugated dienes and α-monoolefins, produces the desired 1,4-dienes in good yield.

SUMMARY OF THE INVENTION

According to this invention a catalyst for use in preparing 1,4-dienes is prepared by mixing a cobalt salt, an organoaluminum compound, and a trisphosphine of the formula

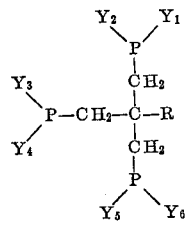

wherein R is hydrogen, $C_1$-$C_{18}$ alkyl, $C_4$-$C_8$ cycloalkyl, $C_6$-$C_{15}$ aryl, $C_7$-$C_{16}$ alkaryl, or $C_7$-$C_{16}$ aralkyl; and each of $Y_1$, $Y_2$, $Y_3$, $Y_4$, $Y_5$ and $Y_6$ are independently $C_1$-$C_{18}$ alkyl, $C_6$-$C_{15}$ aryl, $C_4$-$C_8$ cycloalkyl, $C_7$-$C_{16}$ aralkyl, $C_7$-$C_{16}$ alkaryl or $C_6$-$C_{15}$ substituted aryl wherein the substituents are chloro, bromo or iodo. The invention also provides a process which utilizes said catalyst in preparing 1,4-dienes from α-monoolefins and conjugated dienes.

DETAILED DESCRIPTION

Ethylene is the preferred monoolefin for use in the present invention, being commercially available in large quantities at a very low price and, importantly, capable of combining with a conjugated diene to give a 1,4-diene having a terminal carbon-carbon double bond well suited for the reaction with coordination catalysts. Other α-monoolefins which can be used in this invention are those having the formula R—$CH_2$—CH=$CH_2$ where R is hydrogen, $C_1$-$C_{15}$ alkyl or halogenated $C_1$-$C_{15}$ alkyl. Of this group the commercially available members having up to about 6 carbon atoms are preferred; propylene is the most preferred because of its availablity and the importance of the dienes formed when it is used. A preferred example of the halogenated α-monoolefin is 5,6-dibromo-1-hexene. Other examples of hydrocarbons and halogenated hydrocarbon alpha-monoolefins suitable for use in the present invention are given in U.S. Patent 3,222,330 to Nyce et al.

The conjugated dienes which are used in this invention are those having the formula:

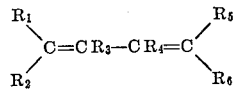

wherein $R_1$ can be different from $R_5$ and each can be tolyl, halophenyl, phenyl, alkyl, hydrogen or $R_1$ and $R_5$ can be joined together to form a cyclic diene containing up to 12 carbon atoms in the ring; $R_2$ and $R_6$ are individually from the group alkyl and hydrogen and $R_3$ and $R_4$ are individually from the group hydrogen, alkyl, aryl, alkaryl, aralkyl and halo. The preferred conjugated diene for use in the present invention is 1,3-butadiene; it is commercially available in large quantities at an attractive price and when combined with ethylene, makes possible the preparation of 1,4-hexadiene which is a monomer particularly preferred for use in preparing sulfur-curable hydrocarbon elastomers by coordination catalysis. Other conjugated dienes which are useful in the present invention include isoprene, 1,3-pentadiene; 2,3-dimethyl-1,3-butadiene; 2,3-dichloro-1,3-butadiene; 1-phenyl-1,3-butadiene; 2-phenyl-1,3-butadiene; 1-p-tolylbutadiene; 1,2-diphenyl-1,3-butadiene; 2,3-diphenyl-1,3-butadiene; 2-ethyl-1-phenyl-1,3-butadiene and 1-p-chlorophenyl-1,3-butadiene.

Although the reaction of this invention in which 1,4-dienes are prepared involves the equimolecular addition of an α-monoolefin to a conjugated diene, it is not necessary to employ equimolar amounts of reactants. In typical batch operations the ratio of reactants can be continually changing. Both the α-monoolefin and the conjugated diene can be introduced into the reactor to establish a suitable value of the ratio before the reaction is initiated; thereafter additional α-monoolefin is fed therein during the course of the reaction until the desired conversion of the conjugated diene to the 1,4-diene is obtained. One or both of the reactants can be charged to the reaction vessel, continuously or intermittently during the reaction. In a preferred process, ethylene is maintained at practically a constant pressure over the diene (which is usually in solution as discussed hereinafter), until consumption of ethylene ceases. The proportions of reactants to be used in a given reaction may be routinely determined by one skilled in the art with reference to the examples which follow.

The catalysts of this invention are prepared by mixing an organoaluminum compound, a cobalt salt and a trisphosphine of the above-specified formula. Any of the organoaluminum compounds useful in the coordination catalysis of ethylene can be used. Suitable classes include triorganoaluminums; organoaluminum halides such as diorganoaluminum monohalides, organoaluminum dihalides, and organoaluminum sesquihalides; diorganoaluminum hydrides and diorganoaluminum alkoxides wherein the alkoxy group contains about 1–8 carbon atoms. The organic groups in the organoaluminum compounds include alkyl, aryl, aralkyl and alkaryl radicals and the halides are chloro, bromo or iodo.

The molecular weight of the organoaluminum compound is not critical; in general practice there is usually no practical advantage in employing compounds wherein the individual organic groups have more than 18 carbon atoms. The preferred compounds are the organoaluminum halides, diisobutylaluminum monochloride being particularly preferred because of the fast rate of reaction which it induces and its availability. Isobutylaluminum dichloride and ethylaluminum sesquihalide are also useful in this invention. Other useful representative organometal compounds include: triisobutylaluminum; tri-n-butylaluminum; diethylaluminum bromide; isobutylaluminum dibromide; diisopropylaluminum monochloride; di-n-hexylaluminum monochloride; di-n-amylchloroaluminum; isopropylaluminum dichloride; triphenylaluminum; diphenylaluminum monochloride; bis(p-tolyl)aluminum monochloride; bis(p - chlorophenyl)aluminum monochloride; bis(3,4 - dichlorophenyl)aluminum monochloride; bis(p-fluorophenyl)aluminum monochloride; dibenzylaluminum monochloride; and polymeric organoaluminums such as aluminum isoprenyl. Similar compounds containing condensed aromatic rings such as diisobutylnaphthylaluminum are also suitable. Since the triorganoaluminum compounds do not form as active catalysts as do the organoaluminum halides, they should be used in conjunction with severe conditions such as high pressures and prolonged periods of reaction.

A wide variety of cobalt salts can be used in this invention including those containing the cobalt atom in the (II) or (III) valence state. Representative examples are cobalt tris(acetylacetonate), cobalt bis(acetylacetonate), colbalt (II) chloride (CoCl₂), cobalt (II) bromide (CoBr₂), cobalt (II) iodide (CoI₂) and cobalt (II) diacetate. Preferred cobalt salts are the cobalt (II) and (III) acetylacetonates because of their high activity, ready availability, and convenience of use.

In preparing the catalyst, the organoaluminum compound is utilized in amounts such that there is at least 1 gram-atom of aluminum for each gram-atom of cobalt in the catalyst. When the cobalt salt is a cobalt acetylacetonate, at least 8 gram-atoms of aluminum should be used for each gram-atom of cobalt. Greater amounts of aluminum up to 200 gram-atoms or more per gram-atom of cobalt can be used but are not economical. The amounts of aluminum within this range to be used in order to form effective catalysts will vary with the cobalt salt employed, but can be routinely determined by one skilled in the art. A preferred general ratio is about 10–20 gram-atoms of aluminum per gram-atom of cobalt. Aluminum present in this quantity is commercially feasible and gives excellent reaction rates.

The trisphosphine component of the catalysts of this invention corresponds to the formula:

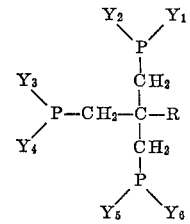

wherein R is hydrogen, $C_1$–$C_{18}$ alkyl, $C_4$–$C_8$ cycloalkyl, $C_6$–$C_{15}$ aryl, $C_7$–$C_{16}$ alkaryl or $C_7$–$C_{16}$ aralkyl and each of $Y_1$, $Y_2$, $Y_3$, $Y_4$, $Y_5$ and $Y_6$ is independently $C_1$–$C_{18}$ alkyl, $C_4$–$C_8$ cycloalkyl, $C_7$–$C_{16}$ aralkyl, $C_7$–$C_{16}$ alkaryl, $C_6$–$C_{15}$ aryl or $C_6$–$C_{15}$ substituted aryl wherein the substituent is chloro, bromo or iodo. The trisphosphine is employed in amounts such that there are from about 2.5–4.0 atoms of phosphorous per atom of cobalt in the catalyst. The preferred trisphosphine is 1,1,1-tris(diphenylphosphinomethyl) ethane since it is more readily available than the other trisphosphines and promotes rapid reactions with good yields of the 1,4-diene. Other trisphosphines which can be used include 1,1,1-tris(diethylphosphinomethyl)ethane,
1,1,1-tris(diphenylphosphinomethyl)ethane,
1,1,1-tris[di(p-tolyl)phosphinomethyl]ethane,
1,1,1-tris[di(m-tolyl)phosphinomethyl]ethane,
1,1,1-tris[di(n-butyl)phosphinomethyl]ethane, and
1,1,1-tris(dicyclohexylphosphinomethyl)ethane.

The trisphosphine component can be prepared by reacting the corresponding tris(chloromethyl) or tris (bromomethyl) compound, R—C(CH₂—X)₃, wherein X is chloro or bromo, with the appropriate sodium phosphide. The preparation of the preferred compound, 1,1,1-tris(diphenylphosphinomethyl)ethane, is illustrated below. Other trisphosphines useful in this invention can be prepared in the same manner by employing the appropriate derivatives of the reactants indicated.

1,1,1-tris(diphenylphosphinomethyl)ethane is prepared by reacting the corresponding trichloride and sodium diphenyl phosphide

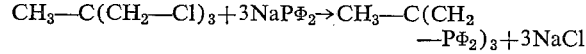

where Φ is phenyl. The chloride is added to a suspension of the sodium diphenyl phosphide in an organic solvent. After the mixture has been heated, the sodium chloride is filtered off. Further details regarding the conditions of this reaction are given in W. Hewertson and H. R. Watson [J. Chem. Soc. (London), 1962, pp. 1490–1494]. The trichloride, CH₃—C(CH₂—Cl)₃, can be prepared by reacting the corresponding triol with thionyl chloride.

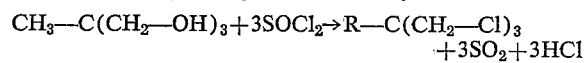

W. H. Urry and J. R. Eiszner [J. Am. Chem. Soc., 74, pp. 5822 and 5825 (1952)]. The triol, in turn, can be prepared from the readily available starting materials propionaldehyde, formaldehyde, calcium oxide, pyridine, and water. Typical references giving details of this reaction are U.S. 2,292,926, H. Hosaeus [Ann., 276, p. 76

(1901)], Dermer and Solomon [J. Am. Chem. Soc., 76, pp. 1697–9 (1954)], and Japanese Patent 153,925 (Chem. Abstracts, 43, 3447i).

The catalyst components are preferably mixed together in a liquid solvent but can be mixed in the absence of any solvent. The hereinafter-described inert organic diluents in which the reaction is carried out are suitable solvents for the catalyst components. The components can be mixed separately, i.e., preformed in the absence of the monomer reactants, or in situ in the presence of the monomers. In most cases the order is not critical and allows for a variety of procedures to be used at the convenience of one skilled in the art. To avoid undesirable side reactions, however, it is preferred that the cobalt salt and the trisphosphine be brought together before the organoaluminum compound and both of the reactants are present. When the cobalt salt is a cobalt halide, it is essential that this procedure be followed for reasons given below. In such cases, the organoaluminum is added to the other two catalyst components before or after the α-monoolefin and the diene are present. Best catalyst activity results when the entire catalyst is preformed and aged at least about 5 minutes prior to use. When the cobalt salt employed is a cobalt halide, it is necessary to mix the halide with the trisphosphine to obtain a cobalt salt-trisphosphine complex prior to adding the organoaluminum compound, otherwise the complex is not formed in effective amounts because of the insolubility of the cobalt halides. The term "mixing" as used herein with respect to the catalyst components should be so construed.

The preparation of the catalyst and its use in effecting the formation of 1,4-dienes from α-olefins and conjugated dienes can be carried out over a wide range of temperatures. Values varying from about 25° C.–150° C. can be used. At temperatures below about 80° C. the rate may be too slow for operating convenience. The preferred temperature range lies between 80 and 120° C., about 90–100° C. being particularly preferred for practical operation and good rates of reaction.

The proportion of the catalyst in the monomer reaction zone can be varied widely. For economic reasons, it is desirable to use as little catalyst as possible consistent with a reasonable reaction rate; a lower limit being at least about .001 millimole of cobalt salt per mole of diene used. Typical proportions are illustrated by the examples which follow, though proportions outside these ranges can be employed, if desired.

The pressure employed will vary with the volatility of the monomers, the inert medium used and the reaction temperatures selected. A practical range of pressures for generally available reactors is from about 1 atmosphere absolute to about 2000 p.s.i.g. In order to operate at temperatures at which product formation takes place at a convenient rate, it may be necessary to maintain superatmospheric pressure to liquify the diene.

The reaction is usually carried out in an inert organic diluent. By "inert" it is meant that the diluent will not deactivate the catalyst; thus it does not contain groups bearing Zerewitinoff-active hydrogen atoms, for example, hydroxyl groups, carboxyl groups, and the like and it is free from impurities such as alcohol and water bearing these constituents. Oxygen and carbon monoxide should also be excluded. For optimum yields, the diluent should not undergo side reactions with the catalyst, the monomers, or the 1,4-diene products. Purification of the diluent and monomers can be carried out by the procedures familiar to those skilled in the art of coordination catalysis where organometal compounds are involved. If it is desired to isolate the 1,4-diene from the reaction mixture, it is preferable that the diluent be easily separable; the boiling point of the diluent should thus be different enough from that of the diene product to afford convenient fractionation. Representative suitable diluents include: tetrachloroethylene, methylene chloride, chlorobenzene, aromatic hydrocarbons such as benzene and toluene; and aliphatic and cycloaliphatic hydrocarbons such as hexane and decalin respectively. The greatest catalyst activity occurs in chlorinated hydrocarbons. It is believed that any diluent useful for conducting the coordination catalyzed polymerization of hydrocarbon monomers can be used here. The conjugated diene itself, for example 1,2-butadiene, can serve as the diluent.

The 1,4-diene can be prepared by the process of the present invention in a batch reactor or in a continuous reactor. The reaction time is selected to carry out the desired conversion of 1,4-diene and can vary widely. Optionally, the reaction is stopped by adding a minimal amount of Zerewitinoff-active hydrogen compound, frequently a low molecular weight alcohol such as isopropanol, to deactivate the catalyst. After the reaction has stopped, the gases are let off and the liquid directly distilled, the 1,4-diene being separated by fractionation. Representative separation procedures are given in the examples which follow. The reaction mixture which continually overflows from a continuous reaction zone is treated by suitable continuous or batch purification and fractionation procedures to yield the 1,4-diene, the catalyst being recycled for reuse when desired.

It has also been found that the trisphosphine catalyst component of this invention can be used in combination with monophosphines such as triphenylphosphine and tricyclohexyl phosphine to form excellent catalysts for making 1,4-dienes from α-monoolefins and conjugated dienes. Two representative catalysts of this type can be prepared as follows: (1) one mole of cobalt (II) bromide is mixed with one mole of 1,1,1-tris(diphenylphosphinomethyl)ethane to form a complex, followed by adding one or two moles of tricyclohexyl phosphine and ten moles of diisobutylaluminum chloride in that order, and (2) two moles of triphenyl phosphine and one mole of cobalt (II) chloride are mixed to form a complex followed by adding one mole of 1,1,1-tris(diphenylphosphinomethyl) ethane and ten moles of diisobutylaluminum chloride in that order. Catalysts of this type can be used to prepare 1,4-dienes in high yields at controlled rates with low by-product formation.

As will be apparent from the following examples, this invention provides readily available catalysts which exhibit excellent performance with respect to the rates of reaction which they induce and yields of 1,4-dienes obtained. Parts and percentages are by weight unless otherwise indicated.

Example 1

Examples 1 and 2 illustrate the separate mixing of the cobalt salt and trisphosphine required when highly insoluble cobalt halides are used.

(A) a solution of 1.09 grams (0.005 g.-mole) of anhydrous cobalt (II) bromide in 25 milliliters of absolute ethanol is added under nitrogen to a stirred solution of 3.12 grams (0.005 g.-mole) of [(phenyl)$_2$PCH$_2$]$_3$CCH$_3$ in 75 milliliters of toluene in a 300-ml. round-bottom flask at 25° C. The precipitated red complex is filtered under nitrogen, washed with a mixture of 75/25 (volume) toluene/absolute ethanol, and dried. It weighs 3.47 grams.

(B) A catalyst is prepared under nitrogen at 25° C. by adding 0.005 g.-mole of neat diethyl aluminum bromide to an agitated solution of 0.0005 g.-mole of the cobalt (II) bromide trisphosphine complex in 20 milliliters of chlorobenzene. After 80 minutes this catalyst is injected into a 1.9-liter stirred autoclave which contains 500 milliliters of chlorobenzene and 70 grams of 1,3-butadiene and is at a pressure of 107 p.s.i.g. ethylene at 96° C. Then the resulting mixture is stirred at 96–105° C., ethylene being added as needed to keep the pressure at 97–107 p.s.i.g. After 30 minutes, the catalyst is deactivated with isopropanol. Analysis of the liquid phase by vapor phase chromatography (VPC) indicates that 69 grams of cis-1,4-hexadiene have been produced (65% conversion based on 1,3-butadiene).

Example 2

(A) The general procedure of Part A of Example 1 is used to make 1.1 grams of Co (II) chloride trisphosphine complex by adding a solution of 0.72 gram (0.003 g.-mole) of Co (II) chloride hexahydrate in 25 milliliters of absolute ethanol to 1.87 grams (0.003 g.-mole) of the trisphosphine. The complex is a brown powder.

(B) A 0.005 g.-mole portion of triisobutylaluminum is added at 25° C. under nitrogen to a solution of 0.38 gram (0.0005 g.-mole) of the cobalt (II) chloride trisphosphine complex in 100 milliliters of toluene. The resulting solution of preformed catalyst is promptly transferred to a 400-milliliter stainless steel shaker tube under nitrogen. The tube is closed, charged by distillation with 50 grams of 1,3-butadiene, and heated to 95° C. After ethylene has been added to give a pressure of 750 p.s.i.g., the reactants are shaken for 2 hours at about 95° C. The tube is then cooled, excess gases are slowly vented, and the catalyst is deactivated with n-butanol. VPC analysis of the residual liquid indicates that 4.7 grams of cis-1,4-hexadiene have been produced (6.2% conversion based on 1,3-butadiene).

Example 3

A 1.9-liter stirred autoclave is flushed with nitrogen and charged, in turn, with 0.18 gram (0.0005 g.-mole) of cobalt (III) acetylacetonate, 0.3 gram (0.00048 g.-mole) of [(phenyl)$_2$PCH$_2$]$_3$CCH$_3$ and 500 milliliters of chlorobenzene at 25° C. The autoclave is cooled and 88 grams (1.63 g.-moles) of 1,3-butadiene are distilled in. The autoclave is then heated to 91° C. and charged with ethylene until the pressure is 108 p.s.i.g. After the catalyst has been formed in situ by introduction of 0.005 g.-mole of diisobutylaluminum chloride dissolved in 10 milliliters of chlorobenzene, the mixture is stirred at 91–96° C. for 75 minutes while ethylene is introduced as needed to keep the pressure at 95–100 p.s.i.g. The catalyst is then deactivated with 2 milliliters of isopropanol. VPC analysis of the liquid remaining after gases have been vented off indicates 81 grams of cis-1,4-hexadiene are present (61% conversion based on 1,3-butadiene).

Examples 4, 5 and 6

Cis-1,4-hexadiene is made from ethylene and 1,3-butadiene in 500 milliliters of solvent in an agitated 1.9-liter autoclave in the presence of a preformed catalyst (prepared by combining cobalt (III) acetylacetonate,
[(phenyl)$_2$P—CH$_2$]$_3$CCH$_3$
and diisobutylaluminum monochloride in the solvent and aging for about 20 minutes) at 25° C. Butadiene is distilled into the chilled mixture; ethylene is then pressured in at the desired operating temperature. VPC analysis of residual liquid gives the cis-1,4-hexadiene content. Results are indicated in the table below.

What is claimed is:
1. A cobalt salt-organoaluminum-trisphosphine catalyst prepared by mixing an organoaluminum compound, a cobalt salt, and a trisphosphine of the formula

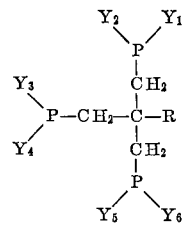

wherein R is hydrogen, $C_1$–$C_{18}$ alkyl, $C_4$–$C_8$ cycloalkyl, $C_6$–$C_{15}$ aryl, $C_7$–$C_{18}$ aralkyl, or $C_7$–$C_{18}$ alkaryl; and each of $Y_1$, $Y_2$, $Y_3$, $Y_4$, $Y_5$ and $Y_6$ are independently $C_1$–$C_{18}$ alkyl, $C_4$–$C_8$ cycloalkyl, $C_7$–$C_{18}$ aralkyl, $C_7$–$C_{18}$ alkaryl, $C_6$–$C_{15}$ aryl or $C_6$–$C_{15}$ substituted aryl wherein the substituents are chloro, bromo or iodo; said components being mixed in proportions such that there are at least 1-gram-atom of aluminum per gram-atom of cobalt and about 2.5–4.0 gram-atoms of phosphorous per gram-atom of cobalt in the catalyst.

2. The catalyst of claim 1 wherein the cobalt salt is cobalt (III) acetylacetonate, cobalt (II) acetylacetonate, cobalt (III) chloride, cobalt (II) chloride, cobalt (II) bromide, cobalt (II) iodide or cobalt (II) acetate and the trisphosphine is 1,1,1-tris(diphenylphosphinomethyl)ethane, 1,1,1-tris(diethylphosphinomethyl)ethane, 1,1,1-tris[di(p-tolyl)phosphinomethyl]ethane, 1,1,1-tris[di(m-tolyl)phosphinomethyl]ethane, 1,1,1-tris[di(n-butyl)phosphinomethyl]ethane or 1,1,1-tris(dicyclohexylphosphinomethyl)ethane.

3. The catalyst of claim 2 wherein the organoaluminum compound is at least one of triorganoaluminums, diorganoaluminum monohalides; organoaluminum dihalides; organoaluminum sesquihalides; diorganoaluminum hydrides or diorganoaluminum alkoxides, wherein the organo groups are $C_1$–$C_{18}$ alkyl, $C_6$–$C_{15}$ aryl, $C_7$–$C_{18}$ alkaryl, or $C_7$–$C_{18}$ aralkyl; the halides are chloride, bromide or iodide, the alkoxy groups are $C_1$–$C_8$ and the trisphosphine is 1,1,1-tris(diphenylphosphinomethyl)ethane.

4. The catalyst of claim 3 wherein the organoaluminum compound is at least one of diisobutylaluminum monohalide, diethylaluminum halide, isobutylaluminum dihalide, or ethylaluminum dihalide, wherein the halide is chloride, bromide or iodide.

5. The catalyst of claim 4 wherein the organoaluminum compound is diisobutylaluminum chloride.

6. The catalyst of claim 5 wherein the cobalt salt is at least one of cobalt (III) acetylacetonate or cobalt (II) acetylacetonate and the organoaluminum compound is diisobutylaluminum chloride.

7. In a process for the preparation of an aliphatic 1,4-diene which comprises reacting, in the presence of a catalyst, an α-monoolefin with a conjugated diene; the improvement which comprises using as the catalyst the product of claim 1.

8. In a process for the preparation of an aliphatic 1,4-diene which comprises reacting, in the presence of a cata-

| Example | Solvent | Co (mM.) | TP[1] (mM.) | Al (mM.) | Aging time (min.) | Pressure[2] (p.s.i.g.) | T. (° C.) | Reaction time (min.) | BD (g.) | HD (g.) | Percent conversion (based on butadiene) |
|---|---|---|---|---|---|---|---|---|---|---|---|
| 4 | ΦCl | 0.5 | 0.48 | 5 | 20 | 88–107 | 92–103 | 23 | 80 | 89 | 73 |
| 5 | CH$_2$Cl$_2$ | 0.5 | 0.48 | 5 | 19 | 91–120 | 68–90 | 18 | 67 | 67 | 66 |
| 6 | ΦCl | 0.5 | 0.53 | 5 | 21 | 95–105 | 96–105 | 50 | 90 | 98 | 72 |

[1] [(Phenyl)$_2$PCH$_2$]$_3$CCH$_3$.  [2] Total pressure after ethylene added.
BD=1,3-butadiene; HD=1,4-hexadiene; ΦCl=chlorobenzene; mM.=millimoles.
The "Aging Time" column indicates the number of minutes that the catalyst was aged after being preformed in the absence of the monomers.

lyst, an α-monoolefin with a conjugated diene; the improvement which comprises using as the catalyst the product of claim 3.

9. The process of claim 8 wherein the α-monoolefin is ethylene or propylene and the conjugated diene is 1,3-butadiene, 2-methyl-1,3-butadiene, 1,3-pentadiene or 2,3-dimethyl-1,3-butadiene.

10. The process of claim 9 wherein the α-monoolefin is ethylene and the conjugated diene is 1,3-butadiene.

11. In a process for the preparation of an aliphatic 1,4-diene which comprises reacting, in the presence of a catalyst, an α-monoolefin with a conjugated diene; the improvement which comprises using as the catalyst the product of claim 5.

12. The process of claim 11 wherein the α-monoolefin is ethylene and the conjugated diene is 1,3-butadiene.

13. In a process for the preparation of 1,4-hexadiene comprising reacting ethylene and 1,3-butadiene in the presence of a catalyst, the improvement which comprises using as the catalyst the product of claim 5 in an amount such that there is at least about .001 millimole of the cobalt salt per mole of conjugated diene.

References Cited

FOREIGN PATENTS 1,462,308  11/1966  France.

PAUL M. COUGHLAN, JR., *Primary Examiner.*

U.S. Cl. X.R.

252—429